US005141213A

United States Patent [19]

Chern

[11] Patent Number: 5,141,213

[45] Date of Patent: Aug. 25, 1992

[54] VISE

[76] Inventor: Sen-Kuen Chern, 660, Hsing-Ho Road, Sha-Lu Town Taichung Hsien, Taiwan

[21] Appl. No.: 772,715

[22] Filed: Oct. 7, 1991

[51] Int. Cl.[5] .......... B23Q 3/02

[52] U.S. Cl. .......... 269/136; 269/134; 269/137; 269/258; 269/282

[58] Field of Search .......... 269/134, 136, 137, 258, 269/261, 262, 282, 283

[56] References Cited

U.S. PATENT DOCUMENTS

| | | | |
|---|---|---|---|
| 573,886 | 12/1896 | Klingenberg | 269/258 |
| 1,349,963 | 8/1920 | Jerrim | 269/258 |
| 1,751,329 | 3/1930 | Hancock | 269/258 |
| 4,928,937 | 5/1990 | Bernstein | 269/136 |
| 5,033,724 | 7/1991 | James | 269/136 |

FOREIGN PATENT DOCUMENTS

| | | | |
|---|---|---|---|
| 8908532 | 9/1989 | PCT Int'l Appl. | 269/136 |

*Primary Examiner*—J. J. Swann

*Attorney, Agent, or Firm*—Browdy and Neimark

[57] ABSTRACT

A vise comprises mainly a base, a sliding member, a movable base, and an urging member. The base consists of a long slot extending axially in the middle thereof and of a holding base located at upper portion of the rear end thereof. The holding base comprises at front end thereof a jaw. The sliding member comprises on front end thereof a cooperating block of a predetermined shape and at front end thereof a circular arc portion having an appropriate curvature radius. The movable base consists of a bevel face with hole having at rear end thereof a bevel fave with a cavity disposed thereon for placing and positioning an intermediate member and of a protruded block with the protruded arc portions of predetermined curvature radii. The urging member is composed of a screw and a top block comprising at rear end thereof a recessed arc portion having a curvature radius corresponding to that of the circular arc portion.

5 Claims, 7 Drawing Sheets

VISE

BACKGROUND OF THE INVENTION

The present invention relates to a mechanical clamping tool, and more particularly to a vise.

As shown in FIGS. 1 and 2, a conventional vise 10 of the prior art holds a workpiece 11 having ends of different sizes and an axial inclination. Jaws 12 and 13 of the vise 10 are not able to clamp securely end portion 111 of the workpiece 11, because it is smaller in size than the other end portion 112. As a result, the end portion 111 is tilted upwardly when the protruded end portion 112 is being worked on for drilling, grinding, milling, etc. Therefore, the finishing of the workpiece 11 can not be done with precision because the workpiece 11 can not be held tightly and securely in place by the vise 10.

SUMMARY OF THE INVENTION

It is therefore the primary objective of the present invention to provide a vise capable of holding tightly and securely a workpiece having at least two longitudinally opposing sides which do not lie in parallel planes so as to permit a mechanical finishing work to be done with precision on the workpiece.

The feature and the objective of the present invention can be better understood by studying the following preferred embodiments, in conjunction with the drawings provided herein.

DETAILED DESCRIPTION OF THE PREFERRED EMBODIMENTS

Figure 1:
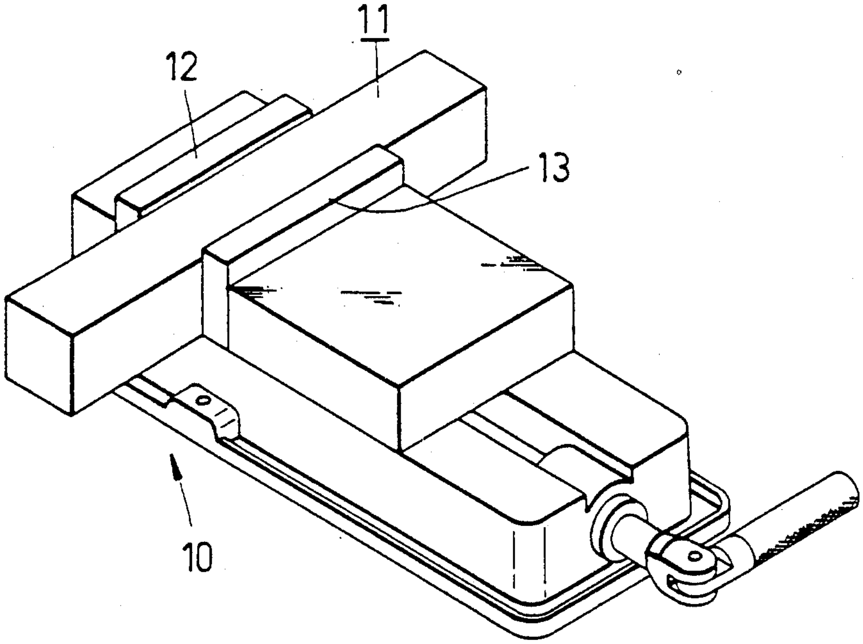
FIG. 1 (PRIOR ART)
FIG. 1 is a perspective view showing a vise according to the prior art.
Figure 2:
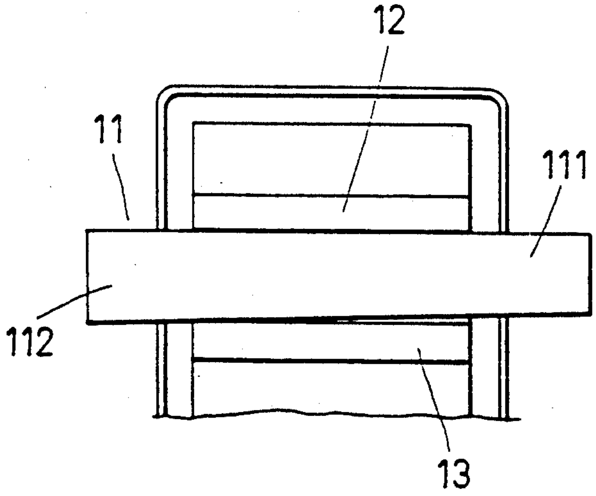
FIG. 2 (PRIOR ART)
FIG. 2 is a top view showing a vise in FIG. 1 in clamping a workpiece having an axial inclination.
Figure 3:
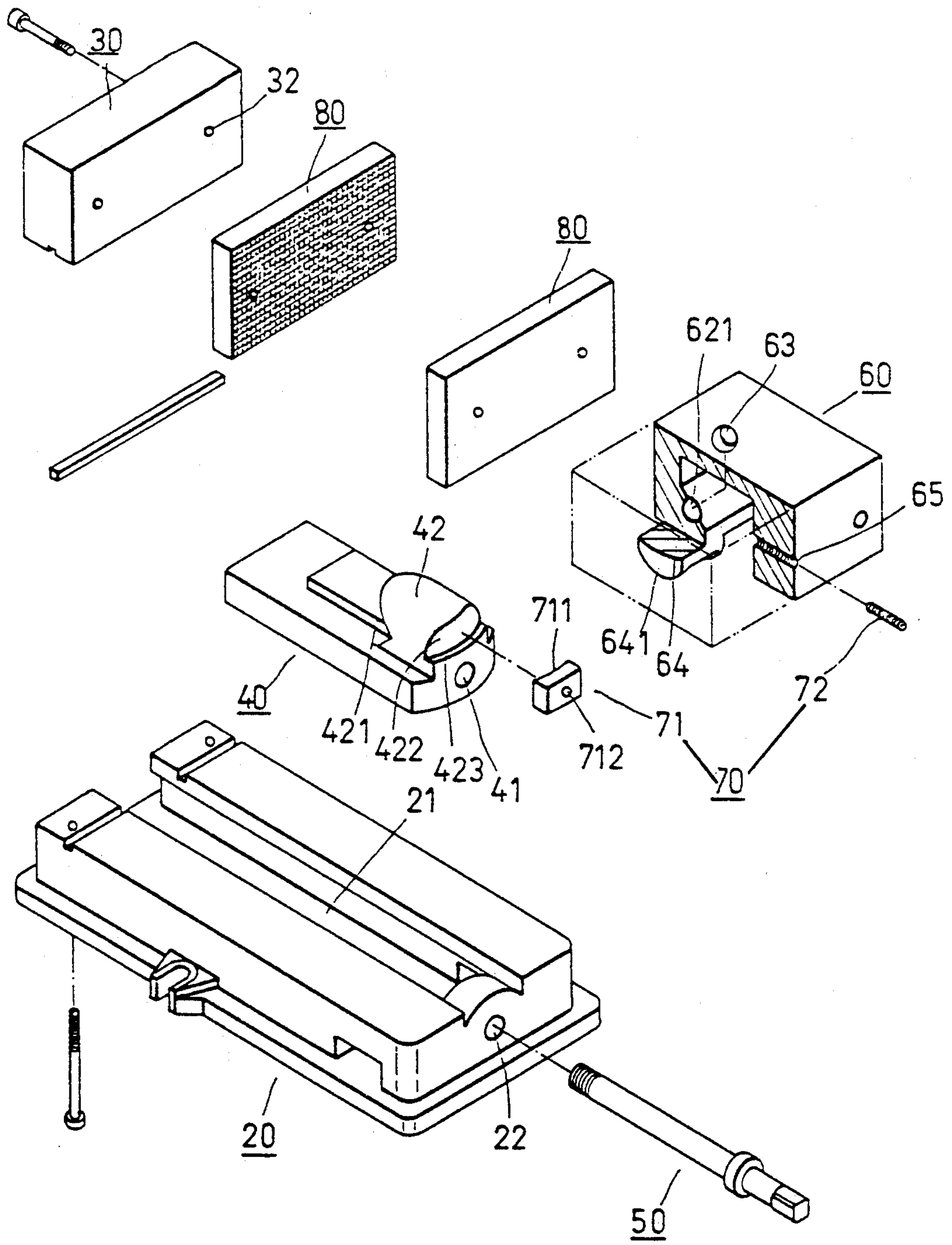
FIG. 3 is an exploded view showing a first preferred embodiment of a vise according to the present invention.
Figure 4:
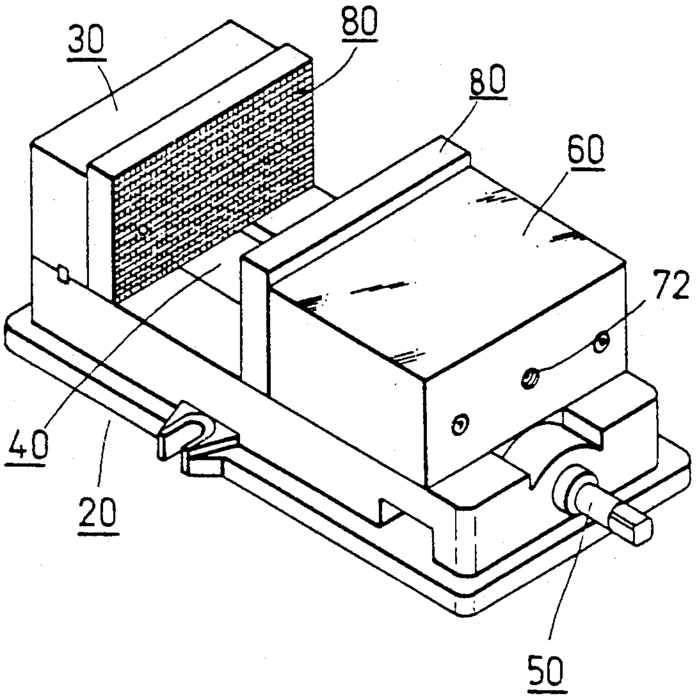
FIG. 4 is a perspective view showing a vise in FIG. 3.
Figure 5:
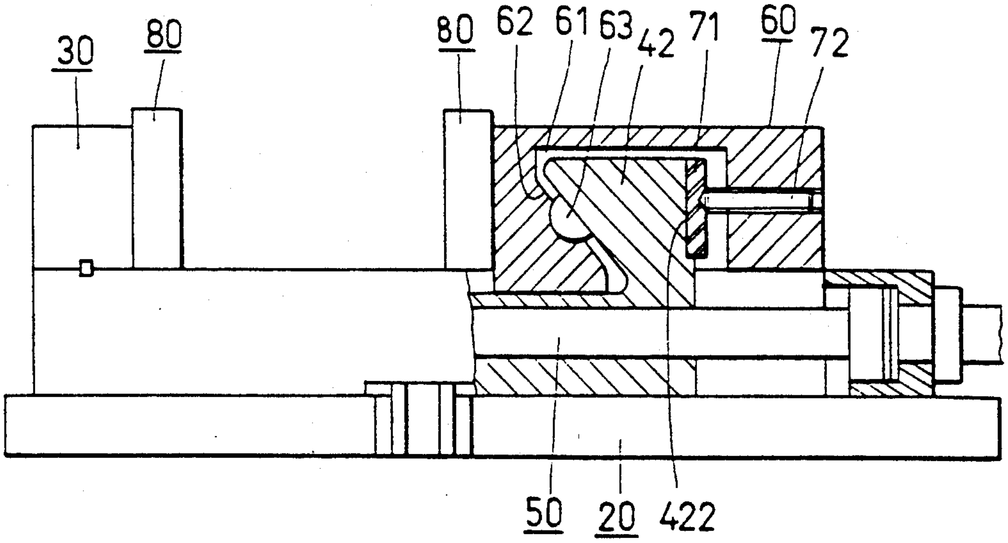
FIG. 5 is a partly sectional view showing a vise in FIG. 4.

Referring now to FIGS. 3–5, a first preferred embodiment of a vise according to the present invention includes a base 20, a holding base 30, fixed to base 20 a sliding member 40, a threaded rod 50, a movable base 60, an urging member 70, and two jaws 80 one jaw 80 is engaged to holding base 30 while the other jaw 80 is engaged to moveable base 60.

The base 20 is provided with a long slot 21, which extends longitudinally along the centerline thereof and comprises at the front end thereof a through hole 22.

As shown in the drawing, the sliding member 40 is slidably engaged in long slot 21 and is provided with a connection hole 41 along the axis thereof. Located on the front end portion of the sliding member 40 is a cooperating block 42 comprising at rear end thereof a recessed portion 421 with an acute angle and at front end thereof a circular arc portion 422 with a curved radius and a shoulder 423 located at the bottom thereof.

The front section of the threaded rod 50 is placed through the through hole 22 of the base 20 to engage with the connection hole 41 of the sliding member 40 so as to actuate the forward and the backward motions of the sliding member 40.

The movable base 60 consists of a cooperating hole 61 disposed upwardly from the bottom mid-section thereof. The cooperating hole 61 is provided at the rear end thereof with a bevel face 62 with a cavity 621 disposed thereon for placing and positioning an intermediate member 63 having two thirds of its body being spherical. The plane surface of the intermediate member 63 fits into the inclined surface of the recessed portion 421 of the sliding member 40. The intermediate member 63 is intended to prevent the rear end of the movable base 60 from tilting upwardly when the movable base 60 is holding a workpiece. This is not a unique feature of the present invention and will not be further expounded here. The movable base 60 is provided at the bottom of rear end thereof a protruded block 64 formed into a unitary body along with the movable base 60. The protruded block 64 comprises at both left and right sides thereof the protruded arc portion 641 corresponding to each other. The movable base 60 further comprises axially at the front end thereof a threaded hole 65 communicating with the cooperating hole 61.

The urging member 70 consists of a top block 71 and a screw 72. The top block 71 is provided at rear end thereof with a recessed arc portion 711 having a curvature radius corresponding to that of the circular arc portion 422 of the sliding member 40. The recessed arc portion 711 further comprises at the center of front end thereof a socket 712. In the process of assembling the urging member 70, the recessed arc portion 711 of the top block 71 is first applied with an appropriate amount of grease and is then attached to the circular arc portion 422 of the sliding member 40.

Figure 6:
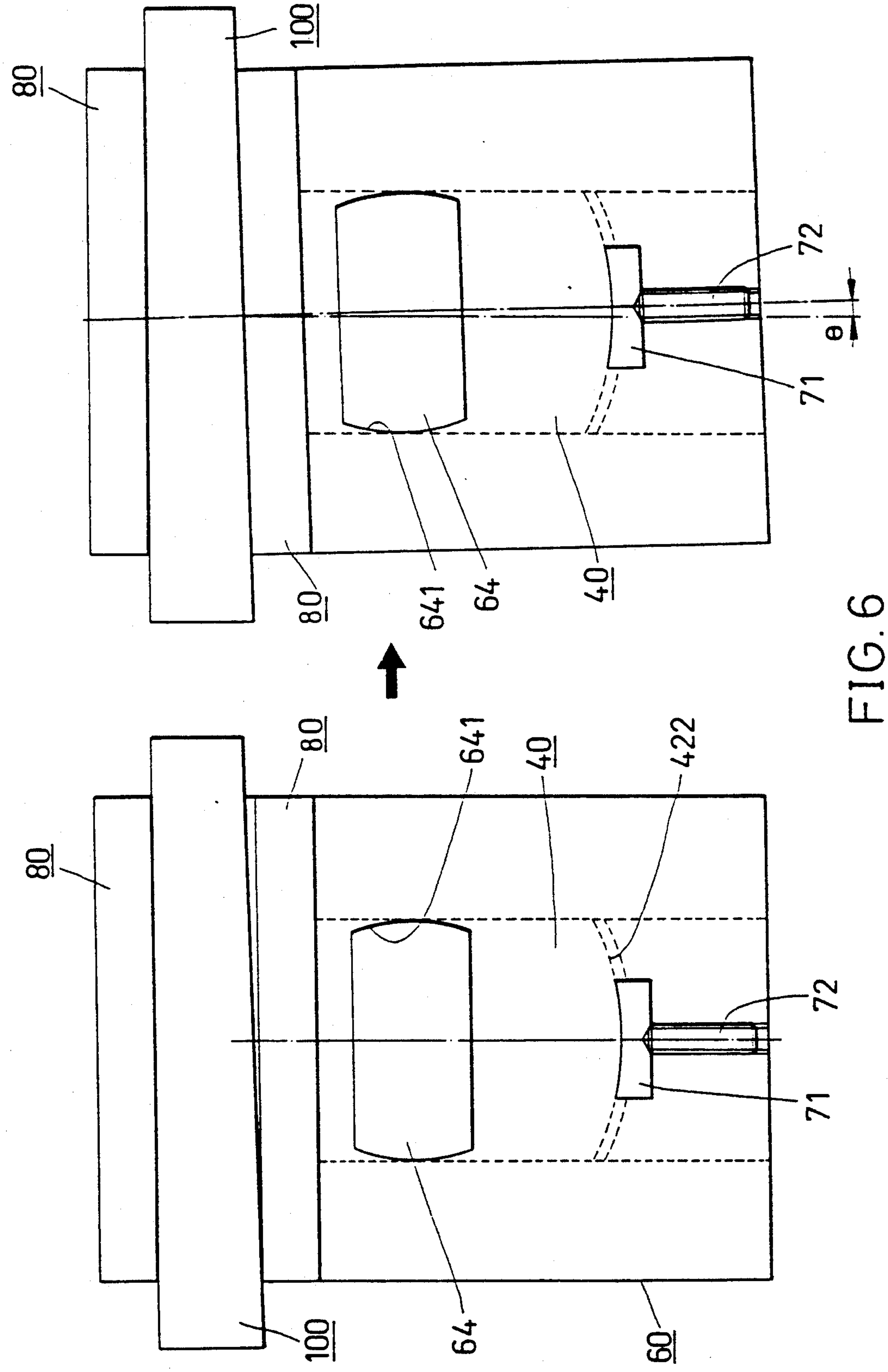
FIG. 6 is a schematic view showing a vise in FIG. 4 in clamping a workpiece having an axial inclination.

As shown in FIG. 6, when the assembled vise is closed to engage a workpiece 100 having sides that are not parallel, the jaw 80 engaged to moveable base 60 first contacts the widest portion of workpiece 100. Thereafter, the moveable jaw 80 begins to rotate through an angle $\theta$ as the vise is closed until the length of both jaws 80 engage the length of workpiece 100 equal to the length of the jaws 80. This is accomplished by rotation of protruded block 64 along left and right protruded arc portions 64-1 in slot 21 while moveable block 6 is held in engagement with sliding member 40 by urging member 70, cooperating block 42 and intermediate member 63. In this manner the workpiece 100 can be clamped securely by rotating the threaded rod 50. The workpiece 100 is so securely held that it is ready for finishing works, such as drilling, cutting, grinding, milling and the like with precision.

Figure 7:
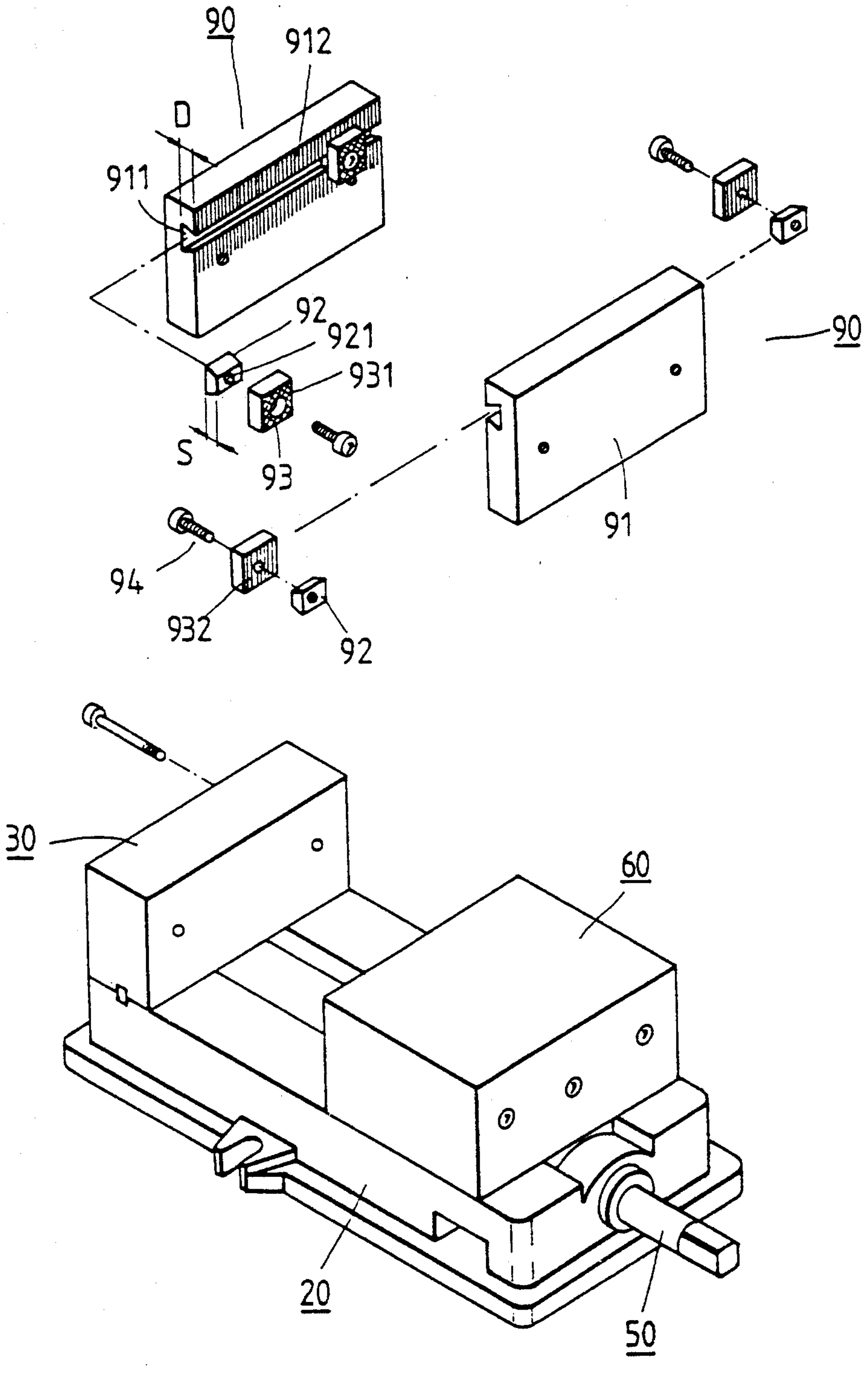
FIG. 7 is a partly exploded view of second preferred embodiment of a vise according to the present invention.
Figure 8:
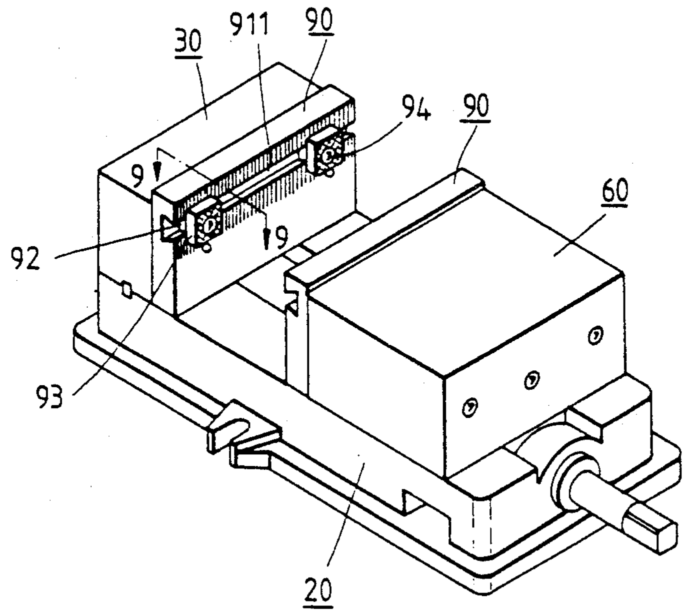
FIG. 8 is a perspective view showing a vise in FIG. 7.
Figure 9:
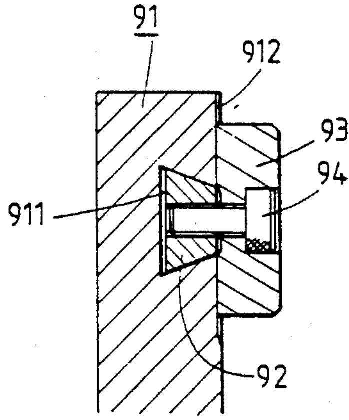
FIG. 9 is a sectional view taken along line 9—9 in FIG. 8.

As shown in FIGS. 7-9, a second preferred embodiment of a vise according to the present invention includes a base 20, a holding base 30, fixed to base 20 a sliding member 40, a threaded rod 50, a movable base 60, an urging member 70, and two jaws 90. One jaw 90 is engaged to holding base 90 while the other jaw 90 is engaged to moveable base 60. With the exception of jaws 90, other components mentioned above are similar in structure to those of the previous embodiment as described above.

Each jaw 90 is composed of a base plate 91, two sliding blocks 92, and two pressing blocks 93.

The base plate 91 is of a rectangular construction and is provided thereon with two screw holes. Each base plate 91 is fastened securely to the holding base 30 or the movable base 60 by means of screws. As shown in FIGS. 7 and 9, the base plate 91 further consists of a horizontally arranged dovetail groove 911 disposed at an appropriate elevation on the front surface thereof and of a plurality of adjacent vertical V-shaped grooves 912 parallel to each other and crossing the dovetail groove 911.

Two sliding blocks 92 have a cross section corresponding to that of dovetail groove 911 and are provided with a screw hole 921 as shown in FIG. 7. The sliding block 92 when engaged in dovetail groove 911 is slightly shorter than the depth of the dovetail groove 911 of the base plate 91.

The pressing block 93 are scored on their front surface thereof by pressed diagonal grooves 931 and have on the back surface thereof a plurality of adjacent vertical grooves 932 in a parallel and side-by-side manner corresponding to vertical V-shaped grooves 912. The pressing block 93 further comprises a sunk head screw hole 933.

In the process of assembling the vise, the sliding block 92 is first inserted into corresponding dovetail groove 911, and then pressing block 93 fixed on the back surface of the holding base 30 or the movable base 60 so that vertical grooves 932 engage corresponding V-shaped grooves 912. A counter sunk screw 94 is placed through the screw hole 933 of the pressing block 93 to engage with the screw hole 921 of the sliding block 92. As soon as the counter sunk screw is fastened, the sliding block 92 is slightly pulled forward as it is shorter than the depth of dovetail groove 911 so as to cause the pressing block 93 to position securely in place.

Figure 10:
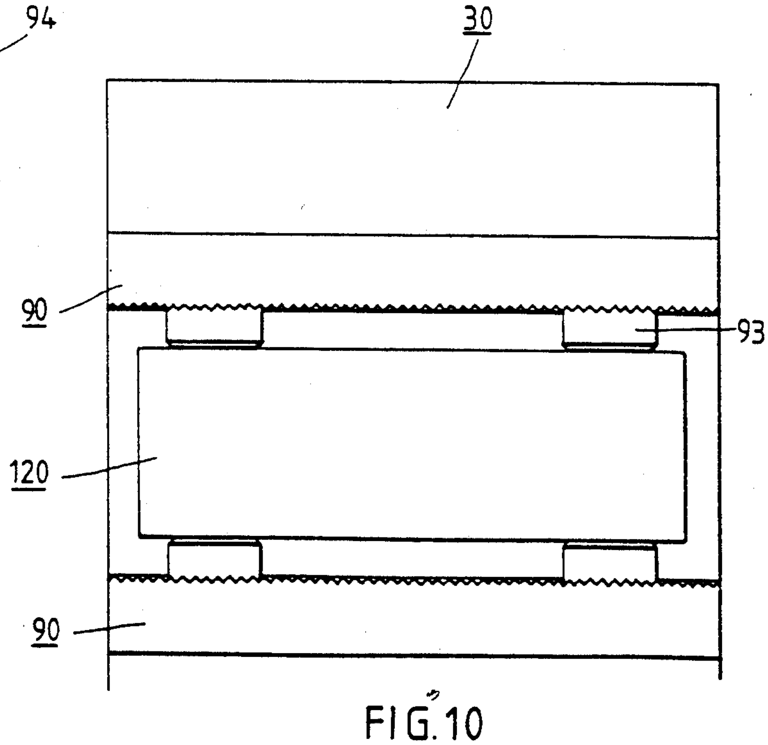
FIG. 10 is a schematic view showing a vise in FIG. 8 in clamping a workpiece.

As shown in FIG. 10, four pressing blocks 93 are used to urge against both ends of the workpiece 120. Such method of holding the workpiece serves to ensure that high quality of finishing work done with precision on the workpiece can be achieved with a greater degree of certainty, as compared with the holding method described above in the first embodiment of the present invention, in which the workpiece in its entirety is held directly by jaws of the vise.

Figure 11:
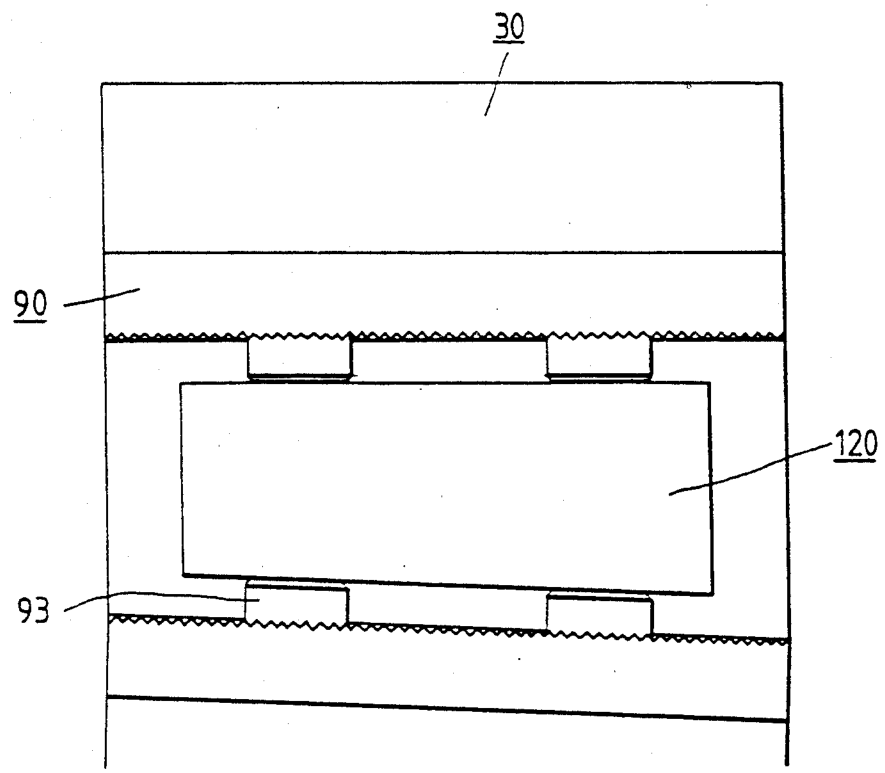
FIG. 11 is a schematic view showing a vise in FIG. 8 in clamping a relatively short workpiece.

If a workpiece relatively short in FIG. 11, an Allen wrench (hexagon wrench) is used to loosen the counter sunk screw 94 so that vertical grooves 932 of the pressing block 93 are no longer confined in corresponding V-shaped grooves 912. A loosed pressing block 92 can then be moved closer to remaining blocks 92 to accommodate shorter workpieces. Such shorter workpiece can be finally held securely by tightening the counter sunk screw 94.

Figure 12:
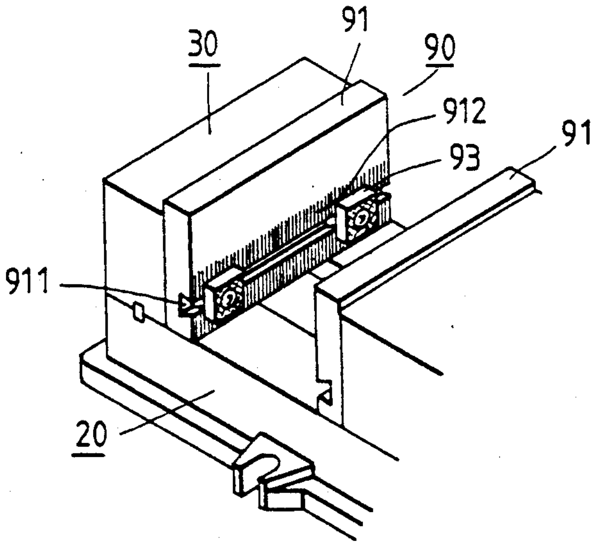
FIG. 12 is a schematic view of second preferred embodiment adjusted to clamping a workpiece which is relatively short in height.

When dealing with a workpiece which is relatively short in height, the jaws 90 can be removed from holding base 30 and the movable base 60 and then rotated 180 degrees and placed in the position shown in FIG. 12. When jaws 90 are in this position, they can better accommodate workpieces that are shorter in height.

As previously discussed above, the arc configurations of the protruded arc portion 641 of the movable base 60, the circular arc portion 422 of the sliding base 40, and the recessed arc portion 711 of the top block 71 join to stabilize moveable base 60 on sliding block 40 when the vise is being closed to contain a workpiece. In fact the movable base 60 of the vise of the present invention can be rotated through angle $\theta$ before the workpiece is engaged by the vise. Once the workpiece has been held securely by and vise, the movable base 60 rotated through angle $\theta$ so that the length of the jaws fully engages the workpiece, movable base 30 cannot be moved further unless the threaded rod 50 is unscrewed.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What I claim is:

1. A vise for engaging a workpiece, which has sides that are not parallel, said vise comprising:

a base having a slot;

said slot extending along the longitudinal centerline of said base;

a holding base fixed on an upper portion of a first end of said base;

a first jaw detachably engaged on a face of said holding base;

a sliding member slidably engaged in said slot;

said sliding member being moved in said slot by a rod rotatable through a second end of said base;

said rod having threads engaged to corresponding threads in a hole in said sliding member;

a cooperating block integrally connected on an upper portion of a first end of said sliding block;

said cooperating block having a convex beveled curved surface at a first end and a convex circular arc surface at a second end;

a movable base having a cooperating hole opening upward from a bottom mid-section thereof;

a concave beveled curved surface on said moveable base at a first end of said cooperating hole corresponding to said convex beveled curved surface of said cooperating block;

a top block adjustably engaged to said movable base at a second end of said cooperating hole;

said top block having a concave circular arc surface corresponding to said convex circular arc surface of said cooperating block;

said concave beveled curved surface on said movable base having a cavity receiving an intermediate member;

said cooperating block engaged in said cooperating hole so that said concave circular arc surface of said top block slidably engages said convex circular arc surface of said cooperating block and said convex beveled curved surface of said cooperating block slidably engages said intermediate member;

a protruded block integrally connected to a bottom first end of said movable base;

said protruded block having curved sides rotatably engaged in said slot;

a second jaw detachably engaged on a face of said movable base opposing said first jaw;

wherein rotation of said rod to close said vise to engage said workpiece results in said second jaw first contacting the widest portion of said workpiece and rotating through an angle until the length of said first jaw and said second jaw engage said workpiece.

2. A vise according to claim 1, wherein said top block is adjusted on said movable base by a socket screw located at a second end of said movable base.

3. A vise according to claim 1, wherein each said first jaw and said second jaw respectively comprise:

a base plate having a horizontal dovetail groove at an elevated position on a face facing said workpiece;

a predetermined number of sliding blocks each having a cross section corresponding to said dovetail groove and a screw hole opening toward said workpiece;

a predetermined number of pressing blocks each having a sunk head screw hole and a countersunk screw engaged to said screw hole of one of said sliding blocks to position said one of said sliding blocks on said base plate.

4. A vise according to claim 3, wherein said base plate has a plurality of vertical parallel adjacent V-shaped grooves on said face facing said workpiece corresponding and engaged to a plurality of vertical parallel adjacent V-shaped grooves on a back surface of each of said pressing blocks.

5. A vise according to claim 4, wherein a surface of each of said sliding blocks parallel to said face facing said workpiece of said base plate is slightly below said face.

* * * * *